United States Patent [19]

Yamasaki

[11] Patent Number: 4,586,862
[45] Date of Patent: May 6, 1986

[54] DRILLING SCREW

[76] Inventor: Katsuhisa Yamasaki, 403 Hirasawa, Hatano-shi, Kanagawa-ken, Japan

[21] Appl. No.: 667,055

[22] Filed: Oct. 31, 1984

Related U.S. Application Data

[63] Continuation of Ser. No. 337,278, Jan. 5, 1982, abandoned.

[30] Foreign Application Priority Data

Jan. 12, 1981 [JP] Japan .................................... 56-2830

[51] Int. Cl.$^4$ ............................................. F16B 25/00
[52] U.S. Cl. .................................................. 411/387
[58] Field of Search ................... 411/387, 386; 10/140; 408/227, 229, 230

[56] References Cited

U.S. PATENT DOCUMENTS

| | | | |
|---|---|---|---|
| 3,517,581 | 6/1970 | Stokes et al. | 411/387 |
| 3,710,676 | 1/1973 | Ringland | 411/387 |
| 3,779,664 | 12/1973 | Caley et al. | 408/230 X |
| 4,125,050 | 11/1978 | Schwartzman et al. | 411/387 |
| 4,222,689 | 9/1980 | Fujiwara | 411/387 |
| 4,407,620 | 10/1983 | Shinjo | 411/387 |

FOREIGN PATENT DOCUMENTS

| | | | |
|---|---|---|---|
| 7707804 | 10/1977 | Netherlands | 411/387 |
| 1316157 | 5/1973 | United Kingdom | 411/387 |

Primary Examiner—Kenneth J. Dorner
Assistant Examiner—Rodney M. Lindsey
Attorney, Agent, or Firm—Holman & Stern

[57] ABSTRACT

Drilling screw comprising a threaded shank and a drill section extending axially from the shank and having a plurality of vertical flat walls, parallel edges and inclined edges formed on the vertical flat walls, protrudent blocks formed respectively by three flat inclined faces and a relief face respectively at the rear of the vertical flat walls, and V-shaped straight flutes formed between the vertical flat walls and adjacent faces of the inclined flat faces. The drill section is formed by all of the flat faces and the cutting edges are provided on the flat vertical walls.

5 Claims, 11 Drawing Figures

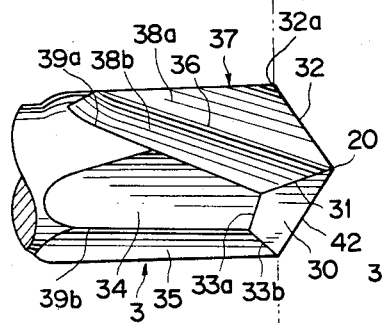
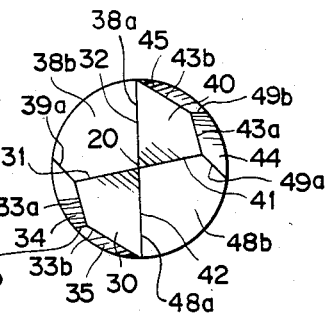
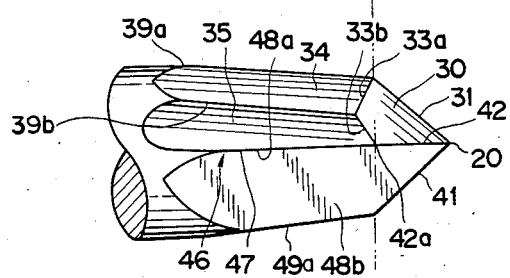
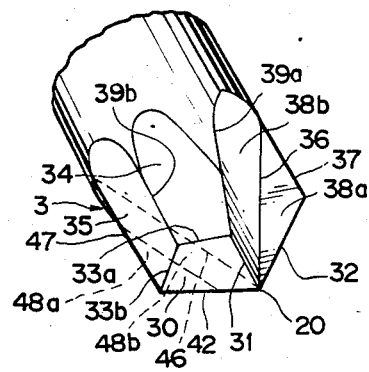
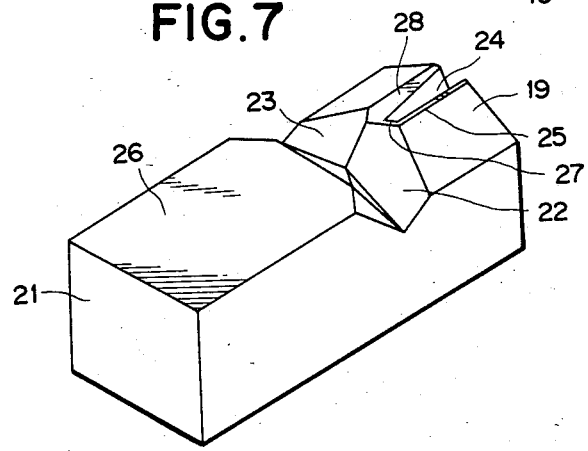

DRILLING SCREW

This is a continuation of application Ser. No. 337,278, filed Jan. 5, 1982, now abandoned.

BACKGROUND OF THE INVENTION

1. Field of the Invention

This invention relates to a drilling screw to drill and fasten workpieces such as steel plates by itself without any preparation of predrilled hole in the workpieces, and more particularly to a drilling screw to apply to the workpieces which is about 1 mm to about 2 mm in thickness.

2. Description of the Prior Art

Two different types of self-tapping screws are known for fastening workpieces together without requiring predrilling holes therefor in the workpieces. One is a cone point tapping screw, and another is a drilling screw which has drill means at a tip portion. Many screws and methods of producing them are known.

The cone point tapping screw comprises a shank section which estends at the same diameter and has threaded convolutions thereon and has a head at one end, a tapered section with tapered threaded convolutions at another end of the shank and, the tapered section terminates in a sharp tip.

The workpieces are broken through by the sharp tip and the hole produced is enlarged by the tapered section, then the drilling through the workpieces is made and the workpieces are fastened by the shank section.

In cases where the workpieces are hard and thick, drilling does not occur efficiently on the tapered section. When the workpieces are drilled, the cone point tapping screw does not move forwardly, but races, and, the tapered section is superheated and damaged. Accordingly, the drilling ability of the screw falls conspiciously.

In a conventional screw, there is an improvement wherein the tip angle is reduced less than 40 degrees and has the tapered section of a circular cone shape in addition threaded convolutions are formed on the tapered section.

The tapping screw is applied to workpieces of relatively soft materials of thin steel plates which are less than 1 mm in thickness and easy to perforate by the sharp tip portion and immediately insert the threaded shank into the hole. Therefore, the required drilling time is reduced as compared with a drilling screw which drills the workpieces by scraping. Also it is able to take the correct position by the sharp tip and to provide the tapping screw at low cost, since the structure thereof is simpler than drilling screws. However, if the tip is excessively sharpened the tip section is easily broken and it is very difficult to provide the threaded convolutions on the tapered section. Therefore the productivity is decreased.

In another drilling screw, the screw has generally a shank which has the same diameter, a head at one end, and a drill section which extends from the shank and has a chisel point at the tip and cutting edges which are symmetrically formed by cutting sections and relief flutes on the shank and drill section. The drill section of the drilling screw scrapes and simultaneously perforates the workpieces the same as a drill section of a drilling screw. The drilling screw is able to be used on workpieces to obtain equivalent drilling efficiency by perforation without regard to the materials and or thickness of the workpieces, which is different from the cone point screw.

However, there is great resistance against advancing the chisel point which is provided to reinforce the cutting edge since it is the same as rotation of an obtuse angle wedge. Therefore, the drilling efficiency is decreased, and the tip of the drilling screw easily slips out of the hole as compared with the cone point screw, and productivity of the drilling screw decreases. Also the cost for manufacturing thereof increases for the reason that the complex structure requires curvature processing in order to be similar to the cutting edge of a drill. Under these circumstances, in a case where the materials of the workpieces are soft or the thickness thereof is less than 1 mm even if the materials are hard, it is better to use the low cost cone point screw which takes a shorter time for drilling than the drilling screw. On the other hand, in a case where the workpieces are hard and are more than 2 mm in thickness, it is better to use a drilling screw to obtain equivalent sharpening perforation efficiency.

SUMMARY OF THE INVENTION

The present invention provides a novel drilling screw to solve the defects of the cone point tapping screw and a conventional drilling screw which has a chisel point. In the steel plate market, steel plates of 1 mm to 2 mm in thickness are generally consumed. The drilling screw of the present invention is suitably applied to steel plates which are 1 mm to 2 mm in thickness.

Accordingly, an object of the present invention is to provide a novel drilling screw to apply to steel plates of 1 mm to 2 mm in thickness.

Another object of the present invention is to provide a novel drilling screw which is formed by all flat faces, and does not have any curved faces at a drilling section, and in which the productivity is good.

Still another object of the present invention is to provide a novel drilling screw which does not have a chisel point that increases resistance against advancing, and which the scraping efficiency is excellent.

A further object of the present invention is to provide a novel drilling screw which has a thick drilling section and is strengthened thereby against breakage of the tip thereof.

BRIEF DESCRIPTION OF THE DRAWINGS

FIG. 3 is a partial diagrammatic front view of a drill section of the drilling screw of the present invention:

FIG. 4 is a side view of the drill section which is rotated 90 degrees from FIG. 1;

FIG. 5 is an end elevational view of the drill section;

FIG. 6 is a perspective diagram of the drill section;

FIG. 7 is a perspective diagram of a die for processing the drill section of the present invention;

DETAILED DESCRIPTION OF THE INVENTION

Figure 1:
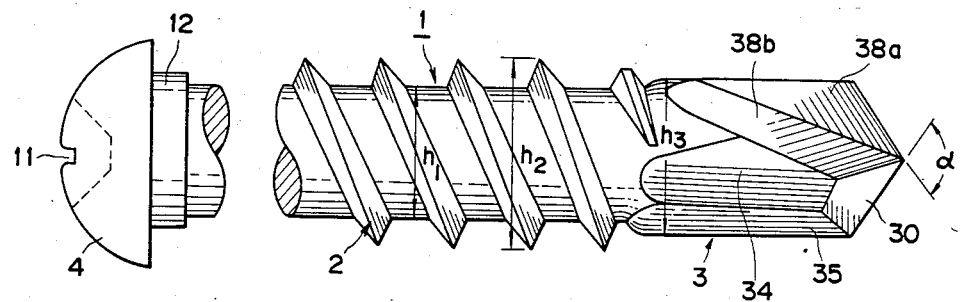
FIG. 1 is a front elevational view showing a drilling screw of the present invention.
Figure 2:
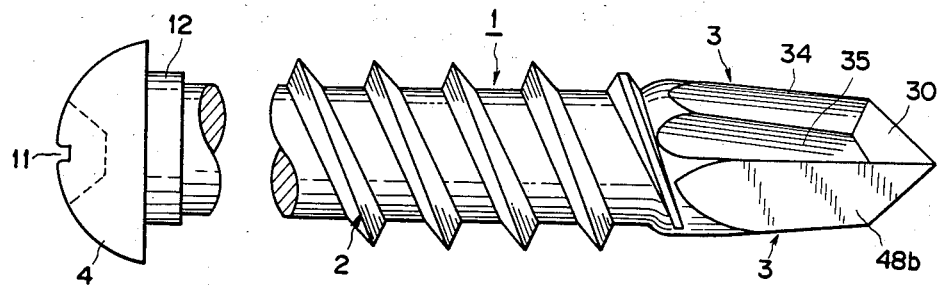
FIG. 2 is a side elevational view of the drilling screw which is rotated 90 degrees from FIG. 1.

Referring to the drawings, which show a preferred embodiment of the present invention, in FIG. 1 and FIG. 2, a drilling screw 1 of the present invention has a threaded convolution 2 provided on a shank, a drill section 3 which extends from the shank, and a head 4 at the other end of the shank. The shank has a base 12 at the end thereof. The shank has a predetermined diameter h1, the threaded convolution has a diameter h2, and the drill section has a diameter h3 as shown in FIG. 1. The diameter h3 of the drill section is larger than the diameter h1 of the shank but is smaller than the diameter h2 of the threaded convolutions.

In FIGS. 3 to 6, the drill section of the present invention is shown.

The drill section 3 has a tip 20 which does not form a chisel point. A pair of relief faces 30 and 40 are provided as end flat surfaces on opposite sides of the axis of the shank and drill section. The relief faces 30 and 40 are symmetrically inequilateral square flat surfaces respectively surrounded by first ridge lines 31 and 41, second ridge lines 33a and 43a, third ridge lines 33b and 43b, and inclined edges 32 and 42.

The drill section 3 has the pair of inclined edges 32 and 42 extending from the tip 20, and has a pair of parallel edges 37 and 47 which are parallel with the axis of the drill section at the periphery in the longitudinal direction. The relief faces 30 and 40 are provided at the rear side of the inclined edge portions. From both the parallel and inclined edges, respectively axially extending flat walls extend at the front sides of these edges. The axially extending walls are shown by the numerals 38a and 48a.

Inclined flat faces 35 and 45 are provided at the rear side of the axially extending walls 38a and 48a inclined from the parallel edges. The longitudinal inclined faces 35 and 45 are adjacent to the relief faces 30 and 40 at one end respectively.

V-shaped flutes 36 and 46 are provided between the axially extending walls 38a and 48a and other inclined flat faces 38b and 48b which are adjacent to the vertical walls. Between the inclined flat faces 35, 45, the inclined flat faces 38b, 48b and the relief faces 30, 40, inclined flat faces 34, 44 are respectively provided.

Each protrudent block, which is approximately a trapezoidal block portion, is respectively provided at rear sides of the vertical walls. The protrudent blocks are surrounded by the faces 30, 34, 35 and 38b protruding from the rear of the vertical wall 48a, and by faces 40, 44, 45 and 48b protruding from the rear of the vertical wall 38a.

Both the first ridge lines 31 and 41 are in a straight line in a top plan view, and both the inclined edges 32 and 42 are also in a straight line in a top plan view, and both the straight lines are formed to make diagonal lines respectively. The first ridge lines 31 and 41 are positioned at the forward direction of rotation of the drill screw for fastening. The inclined edges 32 and 42 are extended to the end of each parallel edge 37 and 47 having the diameter h3.

The parallel edges 37 and 47, and inclined edges 32 and 42 are reinforced by the protrudent blocks formed by the first inclined flat surfaces 38b and 48b, the second inclined flat surfaces 34 and 44, and the third inclined flat surfaces 35 and 45, and the relief face 30 and 40.

The parallel edges and the inclined edges are formed as cutting edges respectively.

An end of the first ridge lines 31 and 41 is adjacent to the bottom line of the V-shaped flutes 36 and 46 at the tip portion 20, and other end of the first ridge lines 31 and 41 are respectively adjacent to inclined top lines 39a and 49a.

The first inclined flat surfaces 38b and 48b are surrounded by the bottom lines of the V-shaped flutes 36 and 46, the first ridge lines 31 and 41, and the first inclined top lines 39a and 49a. The second inclined flat surfaces 34 and 44 are surrounded by the first inclined top lines 39a and 49a, the second ridge lines 33a and 43a, and the second inclined top lines 39b and 49b. And, the third inclined flat surfaces 35 and 45 as relief faces are surrounded by the parallel edges 37 and 47, the third ridge lines 33b and 43b, and the second inclined top lines 39b and 49b.

The inclined edges 32 and 42 form the preferable tip angle $\alpha$ at the tip portion 20. And the drill section 3 of the present invention is formed by all the flat faces, not included any curve faces.

Referring to FIG. 7, the die has three inclined surfaces 19, 22 and 23, a groove 24 in which the shank is supported, a flat surface 26 which contacts with an identical surface of another die, and two inclined edges 25 and 27 and a flat surface 28 by which the substantial drill section is formed.

The above stated tip angle $\alpha$ is preferably formed to be about 90 degrees to 120 degrees. Particularly, the angle of about 110 degrees is preferable.

Accordingly, when the drilling screw of the present invention is manufactured, a pair of dies 21 is used to form the drill section and the threaded convolutions are formed in a conventional manner by a pair of flat dies.

For the test of drilling efficiency, that is, three cases, a steel plate workpiece 5 is supported on a table 9 and is 1.2 mm in thickness. The screw is rotated by an electric driver 6 at 2,500 rpm and is applied to the workpiece with a force of 11 kg. The torque is recorded on a fast cathode-ray tube type oscillograph 8 at predetermined times through a distortion gauge and a distortion amplifier 10 for the torque on the workpiece 5.

Figure 10:
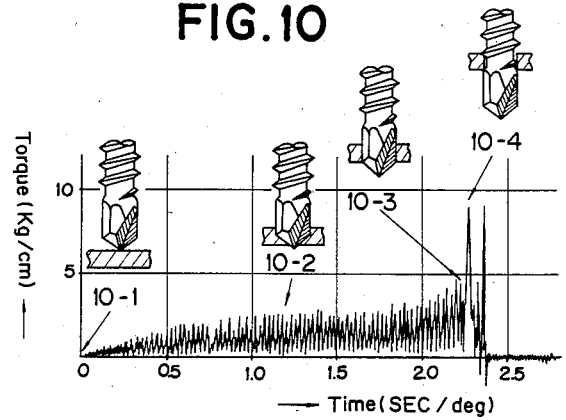
FIG. 10 is a graphical representation showing drilling efficiency of the drilling screw of the present invention.
Figure 11:
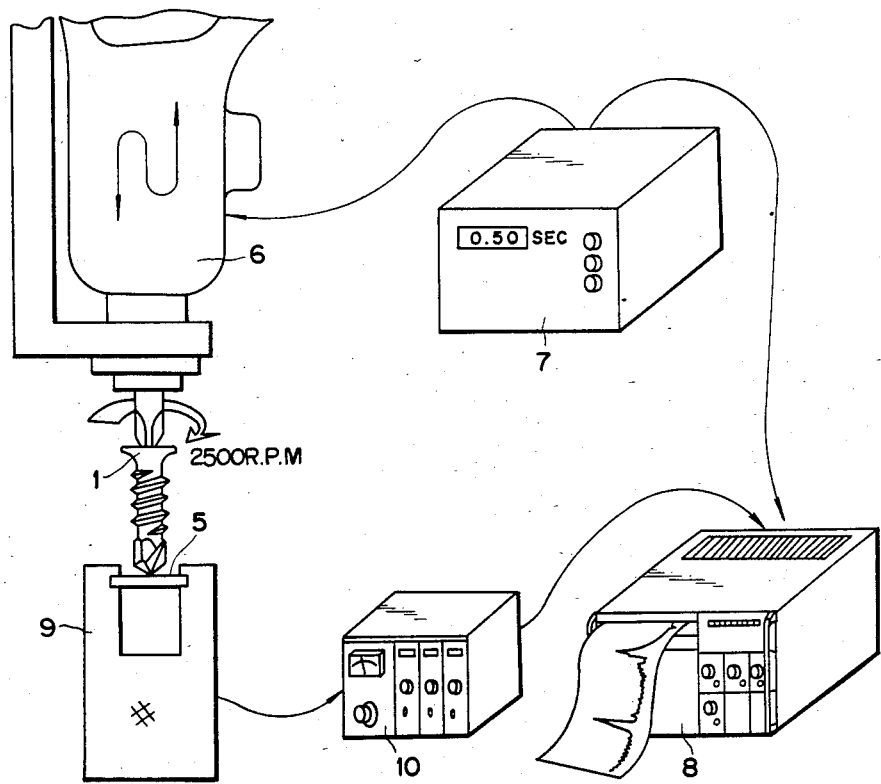
FIG. 11 is a schematic flow diagram showing apparatus for measurement of the drilling efficiency shown in FIGS. 8, 9 and 10.

In FIG. 10 for the drilling screw of the present invention, from the start shown by a numeral 10-1 to the completion of fastening shown by a numeral 10-4, it takes a much shorter time than other conventional screws such as the tapping screw or the drilling screw having the chisel point.

Figure 8:
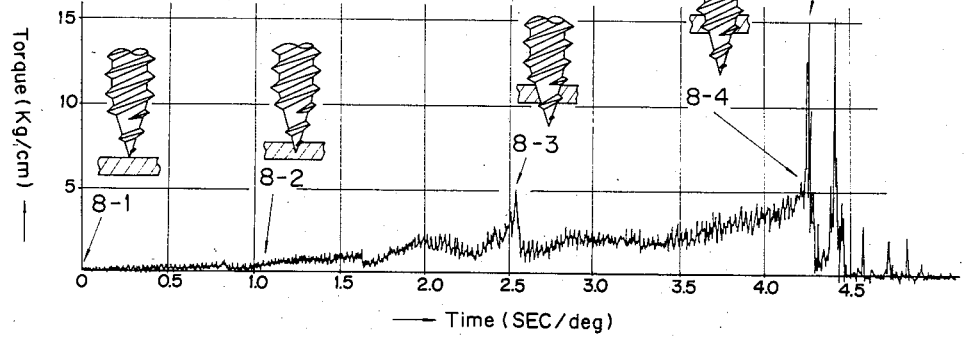
FIG. 8 is a graphical representation showing perforation efficiency of a conventional cone point tapping screw.

In FIG. 8, respectively, the numeral 8-1 shows start, the numeral 8-2 shows time for piercing of the screw edge, the numeral 8-3 shows resistance of the threaded convolutions, the numeral 8-4 shows termination of drilling, and the numeral 8-5 shows torque by piercing of the screw.

Figure 9:
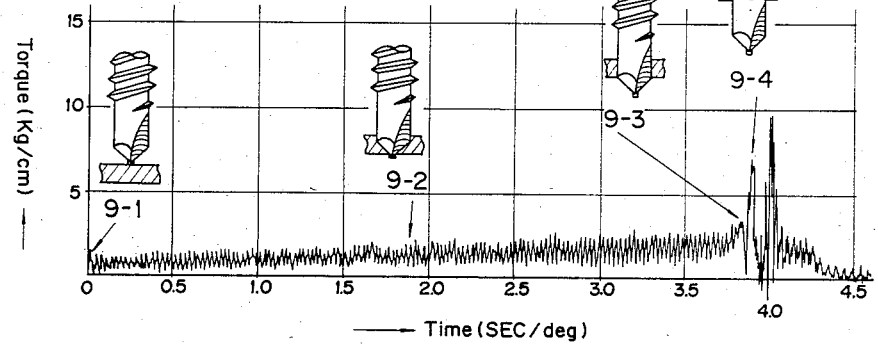
FIG. 9 is a graphical representation showing drilling efficiency of a conventional drilling screw.

In FIG. 9, respectively, the numeral 9-1 shows start, the numeral 9-2 shows time for drilling, the numeral 9-3 shows termination of drilling, and the numeral 9-4 shows torque produced by the drilling.

In FIG. 10, respectively, the numeral 10-1 shows start, the numeral 10-2 shows time for drilling, the numeral 10-3 shows termination of drilling, and the numeral 10-4 shows torque of pierce of the screw.

Turning to FIG. 8, it takes a relatively long time from start 8-1 to time for pierce of the screw edge and the date must pass the long tapered portion of the tapping screw from the numeral 8-2 to the numeral 8-5, and further, it takes a relatively long time for drilling caused by resistance of the threaded convolutions at the numeral 8-3.

Turning to FIG. 8, also it takes a relatively long time from start to completion mainly due to the time for the tip point to pass through the workpiece.

Turning to FIG. 10, the present drilling screw is able to thrust smoothly after start at the numeral 10-1 and it starts drilling shortly after thrust. This fact means that the required drilling time is reduced and the place for drilling is correctly determined, and further no vibration occurs.

At this point, the tapping screw is able to thrust into the workpiece in the same manner as the present invention, but start of drilling is deferred and, therefore, drilling efficiency is greatly reduced. Accordingly, the tapping screw is applied to only thin workpieces.

The conventional drilling screw requires large torque immediately after start as shown by the numeral 9-1, and therefore the tip of the screw slides from the predetermined place for drilling. However, the conventional drilling screw obtains stable drilling, since there is not much alteration of the torque during the drilling operation as compared with the present invention. This excellent efficiency is based on removing ability of the scraps of the workpieces in accordance with forming of the edges to include curved edges and the large cutting flutes provided on the drill section. Therefore, the conventional drilling screw shown in FIG. 9 is particularly applied to thick workpieces having more than 2 mm in thickness to obtain excellent drilling efficiency rather than the present invention.

As above described, the drilling screw of the present invention is comprised of all flat faces, not including curved faces and curved lines, differing from the conventional curved drill section. Therefore, it is exceedingly easy to manufacture the present drill screw and the necessary dies, which makes it suitable for mass production. Then, the drilling efficiency is increased by omission of any chisel point.

Further, in accordance with the V-shaped flutes, the tip of the drill section is reinforced by the protrudent block comprising the relief face and inclined faces including one of the walls of the V-shaped flute.

Thus, the present invention is able to obtain excellent drilling efficiency with workpieces of 1 mm to 2 mm in thickness, and the inclined edges at the tip portion improve the thrust operation without any unsteadiness on the workpieces.

The invention may be embodied in other specific forms without departing from its spirit or essential characteristics. The described embodiment is to be considered in all respect only as illustrative and not limiting and the scope of the invention is, therefore, indicated by the appendant claims rather than by the foregoing description. All changes which come within the meaning and range of equivalency of the claims are considered within their scope. Consequently, it is recognized many variations may be made without departing from the scope or spirit of the present invention.

What is claimed is:

1. A drilling screw having a central axis, a driving head on one end, a drilling tip on the other end, a threaded shank, and a drill section extending axially from the shank toward the tip comprising:

at least two axially extending, substantially radially directed flat walls lying in substantially the same plane on opposite sides of the central axis;

at least two axially extending straight cutting edges parallel to the central axis provided at the outer edges of said flat walls;

at least two inclined cutting edges inclined to the central axis extending from said parallel edges and terminating at a common point, said inclined cutting edges lying in the same plane as said radially directed walls;

a tip end formed at the termination of said inclined edges providing a predetermined tip angle;

at least two inclined flat relief faces extending from said tip end and adjoining said flat axially extending walls at said inclined edges;

at least two first longitudinal flat inclined faces inclined from and adjoining said axially extending flat walls at said parallel edges, and each adjoining one of said relief faces at a respective common edge;

at least two second longitudinal flat inclined faces each extending from said tip end and adjoining a respective one of said axially extending walls to form at least two V-shaped flutes extending from said tip end toward said shank, and each second inclined face adjoining a respective one of said relief faces at a respective common edge extending from said tip end;

at least two third longitudinal flat inclined faces each positioned between respective ones of said first and second inclined faces and adjoining each of said first and second inclined faces at respective common edges, and each adjoining one of said relief faces at a respective common edge disposed between said tip end and said shank; and at least two protruding reinforcing blocks formed by said longitudinal inclined flat faces, said relief faces and said axially extending flat walls.

2. The drilling screw as claimed in claim 1 wherein said tip angle is within the range of about 90 degrees to 120 degrees.

3. The drilling screw as recited in claim 1 wherein the diameter of the drill section is larger than the diameter of the shank, and is smaller than the outer diameter of the threads.

4. The drilling screw as claimed in claim 1 wherein a pair of the parallel edges and respective inclined edges are relatively symmetrical with respect to the central axis.

5. The drilling screw as claimed in claim 1 wherein each protrudent block is an approximately trapezoidal block surrounded by three inclined flat faces and the relief face and is formed on one side of a respective axially extending wall.

* * * * *